United States Patent [19]

Ito

[11] Patent Number: 4,986,255
[45] Date of Patent: Jan. 22, 1991

[54] APPARATUS PURSUEING THE SUN

[76] Inventor: Ryohei Ito, 1366, Iihama, Iwamura-cho, Ena-gun, Gifu-ken, Japan

[21] Appl. No.: 520,347

[22] Filed: May 8, 1990

[30] Foreign Application Priority Data

Jun. 12, 1989 [JP] Japan .............................. 1-681936[U]

[51] Int. Cl.$^5$ .............................................. F24J 2/38
[52] U.S. Cl. .................... 126/424; 126/425; 126/440
[58] Field of Search ............... 126/424, 425, 440, 451, 126/452; 165/96; 353/3; 350/568

[56] References Cited

U.S. PATENT DOCUMENTS

| | | | |
|---|---|---|---|
| 3,982,526 | 9/1976 | Barak | 126/425 |
| 4,044,752 | 8/1977 | Barak | 126/425 |
| 4,091,799 | 5/1978 | Steiner | 126/400 |
| 4,387,702 | 6/1983 | Murphy | 126/424 |

Primary Examiner—James C. Yeung
Attorney, Agent, or Firm—Browdy and Neimark

[57] ABSTRACT

Apparatus for pursuing the sun to secure a constant sunlight energy source comprising a rotary shaft equipped with a light receiver; a thermo-deforming plate to force an area in proximity to its light collecting portion with a raised temperature to become the lowest portion of curved concave; a convex lens placed over the thremo-deforming plate; and a follower rod connected to the rotary shaft in a manner to be able to swivel in the axial direction of the rotary shaft; said follower rod being equipped with a rolling piece in its lower end, so that the thermo-deforming plate underneath and transverse to the rotary shaft in a position whereupon the rolling piece of the follower rod is placed on the thermo-deforming plate in a manner such that the follower rod is forcibly pressed down to place the rolling piece constantly against the bottom of the curved concave of the thermo-deforming plate formed by its thermal deformation. Sunlight passing through the convex lens is collected by the thermo-deforming plate and its light collecting portion deforms thermally leading to the parabolic deformation of the whole thermo-deforming plate. As a result, the rolling piece is rollingly moved by means of the follower rod towards the lowest portion of the thermo-deforming plate, and the light receiver rotationally pursues the sun by the rotation of the rotary shaft connected to the follower rod.

5 Claims, 3 Drawing Sheets

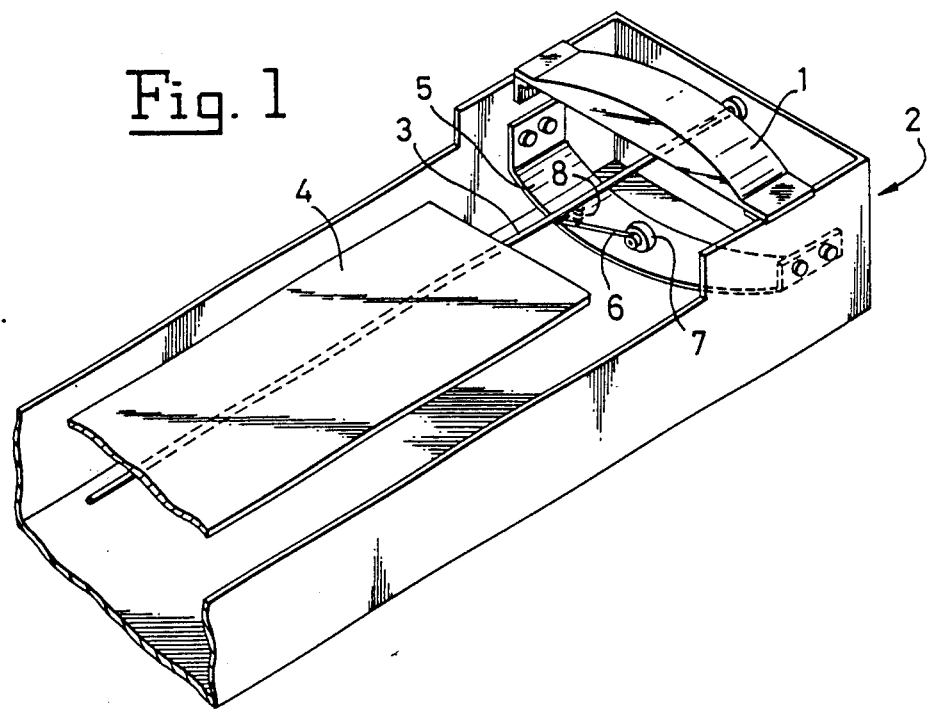
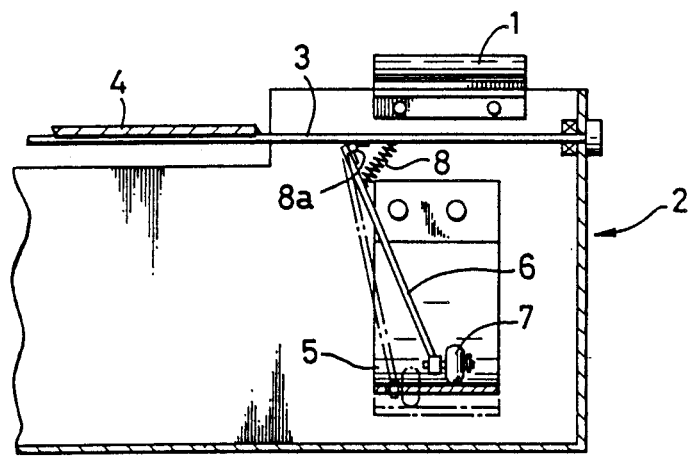

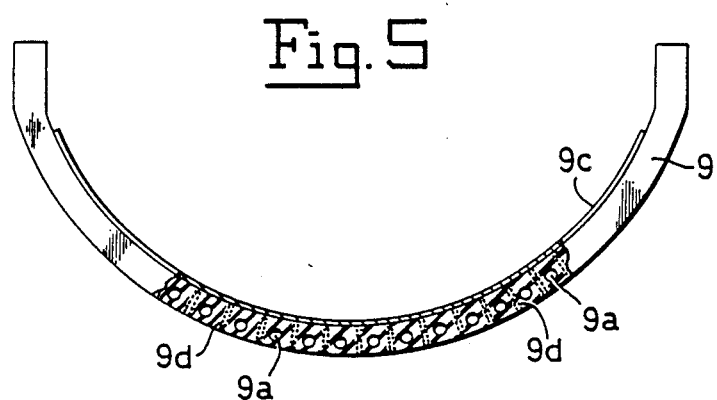
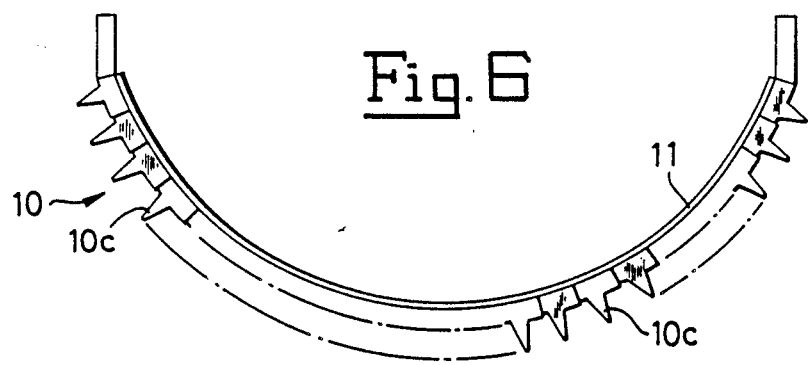
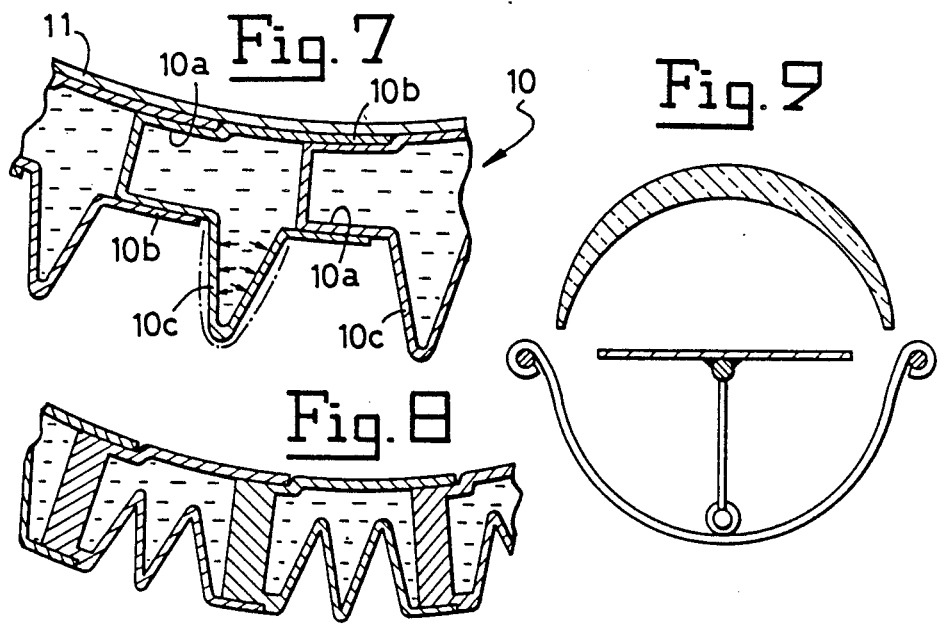

APPARATUS PURSUEING THE SUN

BACKGROUND OF THE INVENTION

The present invention relates to a simple apparatus pursueing the sun to secure constantly the source of solar energy by the fact that the light receiver of a heat collector utilizing the sunlight or of a solar battery pursues the sun constantly.

In the existing simple sun-pursueing apparatus, a mean to displace the light receiver to pursue the sun rotating electric motor driven by means of the signal of contact point of bimetal which detects the heat of sunlight is known.

However in such apparatus, it needs a separate electric motor system driven by other energy to obtain the solar energy. Accordingly the cost of equipment became higher, and it was problematic because it required a sufficient maintenance to secure a precise pursueing accuracy because it comprised unstable elements of electric contact to drive the electric motor.

SUMMARY OF THE INVENTION

The object of this invention is to provide an apparatus for pursueing the sun of low cost and of easy maintenance designed to attain sure rotational displacement of the light receiver without the use of an electric motor system and thereby simplify the structure.

To attain the above object, this invention comprises a rotary shaft being rotatable and equipped with a light receiver to receive the sunlight, a thermo-deforming plate which deforms to force the area in proximity to its light-collecting portion with raised temperature to form the lowest portion of curved concave, a convex lens placed over said thermo-deforming plate, and a follower-rod which is secured to the above rotary shaft in a manner to be able to swivel in the axial direction of the above rotary shaft and is equipped with a rolling piece at its lower end, wherein the thermo-deforming plate, secured at its two extremities to form a curved concave, is placed below and transverse to the rotary shaft in a position thereof so that the light receiver is not positioned, and the rolling piece of said follower rod is placed on the said thermo-deforming plate in a manner so that the follower rod is forcibly pressed down to place the rolling piece constantly against the bottom of the curved concave of thermo-deforming plate formed by its thermal deformation.

And, the operation of this invention is that the sunlight passing through the convex lens is collected on the thermo-deforming plate, and at that portion, the lower surface of the thermo-deforming plate deforms thermally to expand, but due to the fixation at its two extremities, the position of such light collecting portion becomes the lowest portion of curved concave and other portions of the thermo-deforming plate become pulled by the above lowered portion of curved concave resulting in a parabolic thermal deformation of whole thermo-deforming plate. Accordingly, the rolling plate actuated by the follower rod forcibly pressed down onto the thermo-deforming plate being rollingly moved against the lowest portion of curved concave, the rotary shaft secured to the follower rod rotates resulting in the rotational displacement of the light receiver to pursue the sun.

BRIEF DESCRIPTION OF THE DRAWINGS

FIG. 1 is a perspective view of an embodiment of this invention;

FIG. 2 is a side sectional view of FIG. 1;

FIG. 5 is a front view partly in section of a thermo-deforming plate;

FIG. 6 is a front view of still other example of a thermo-deforming plate;

FIG. 7 is an enlarged sectional view of the principal portion of FIG. 6;

FIG. 8 is an enlarged sectional view of the principal portion of and other example of a thermo-deforming plate in FIG. 6; and FIG. 9 is a view of the disposition of an other example of a convex lens.

DESCRIPTION OF THE PREFERRED EMBODIMENT

Figure 3:
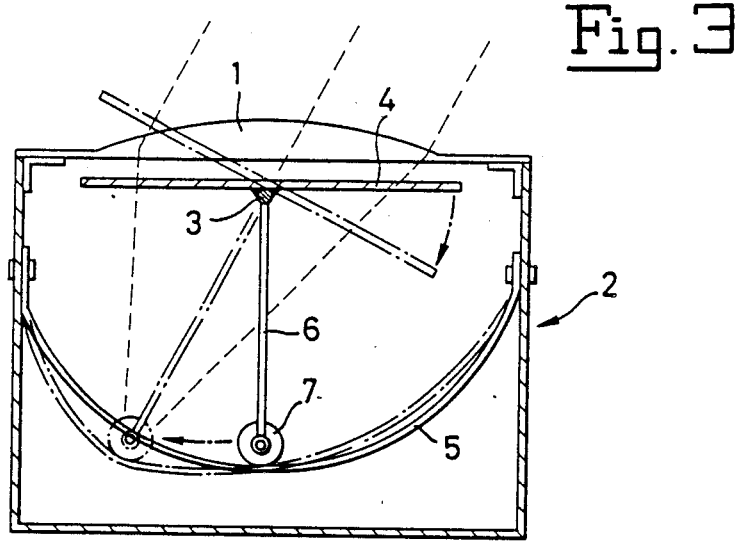
FIG. 3 is a front sectional view of FIG. 1.

An embodiment of the invention shown in FIGS. 1 through 4 will now be described in detail.

In the apparatus of the embodiment, a convex lens 1 is secured on the top of one end of a container box 2. Along the longitudinal direction of the box 2, a rotary shaft 3 is rotationally supported by bearings underneath the convex lens 1, and a light receiver 4 receiving the sunlight is rigidly secured to the rotary shaft 3. A thermo-deforming plate 5 is disposed underneath the convex lens 1 in the form of an approximate semi-circle having its approximate axis along the axis of the rotary shaft 3. Both extremities of the thermo-deforming plate 5 are secured to the container box 2 with set-screws. Furthermore, the thermo-deforming plate 5 is made of a shape memory alloy and its light and heat collecting portion deforms thermally.

Moreover, a follower rod 6 is pivotally connected to the rotary shaft 3 by means of a hinge 9 in a manner to be able to swivel in the direction of the axis of the rotary shaft, and the lower end of said follower rod 6 is equipped with a rolling piece 7 disposed on the thermo-deforming plate 5 wherein the rolling piece 7 can move rollingly.

Furthermore, by disposing a spring 8 between the rotary shaft 3 and the follower rod 6 to forcibly press down the follower rod 6, the rolling piece 7 is constantly maintained to press over the thermo-deforming plate 5.

Now, the functioning of this embodiment will be explained.

As shown in FIG. 3, when the follower rod 6 is situated perpendicular, its rolling piece 7 is located onto the central portion of the thermo-deforming plate 5 where the central portion is equal to the lowest portion, and the light receiver 4 stays in the horizontal condition.

Figure 4:
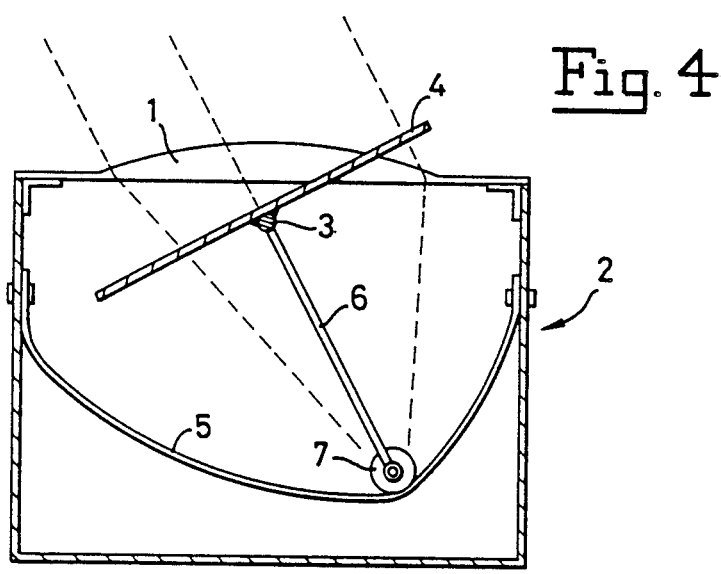
FIG. 4 is a front sectional view of FIG. 1 at operating condition.

Starting from above condition, when the sunlight is collected onto one portion of the thermo-deforming plate 5 by means of the convex lens 1 as shown in FIG. 4, that portion tends to shorten the radius of curvature due to thermal deformation.

However, due to the fixation at its two extremities, the thermo-deforming plate 5 transforms into a parabolic form having its light-collecting portion at the lowest portion of curved concave. Accordingly, due to the fact that the follower rod 6 is displaced so as to press the rolling piece 7 onto the lowest portion of curved concave by the force of the spring 8, the rolling piece 7 moves rollingly onto the lowest portion of the curved concave as shown in FIG. 4. As the result, the follower rod 6 rotates the axis of the rotary shaft 3 and consequently, the rotary shaft 3 rotates together with the follower rod 6 and the light collector 4 secured to the rotary shaft 3 is disposed to an inclined situation.

Moreover, depending on the displacement of the position of the sun, when the sunlight passes through the convex lens 1 as indicated by the imaginary line of FIG. 3, the thermo-deforming plate 5 deforms as indicated by the imaginary line and this deformation generates the displacement of the rolling piece 7 leading to swivelling motion of the follower rod 6 and to the inclined disposition of the light receiver 4 as indicated by the imaginary line.

In any case, the follower rod 6 displaces in the axial direction of the rotary shaft 3 resulting into the displacement of the rolling piece 7 as shown by imaginary line in FIG. 2.

When the sun sets, the thermo-deforming plate 5 returns to its original semi-circular form as shown in FIG. 3.

As illustrated about this example, this invention, relating to the position of the sun, collects the sunlight from its position onto the thermo-deforming plate 5 through the convex lens 1 and transforms the thermo-deforming plate 5 into a situation of curved concave having the lowest point at its light collecting portion whereupon the rolling piece 7 is constantly and forcibly displaced leading to the inclination of the light collector 4 through the rotation of the follower rod 6.

Moreover, in this embodiment, by the approximately semi-circular disposition of the thermo-deforming plate with its approximate axis along the rotary shaft, the sunlight can be collected very favorably.

Although the embodiment is constituted as illustrated above, this invention is not restricted by the embodiment but technical modifications may be made within the scope of the invention which is delineated by the following claims.

For example, the thermo-deforming plate is satisfactory for its purpose if it can deform and bend to provide the lowest portion of a curved concave according to the temperature rise of the area in proximity to the light collecting portion due to the fixation at its two extremities regardless of its material and structure. For this purpose, as shown in FIG. 5, the structure of the thermo-deforming plate can be of a rubber plate 9 preformed into a shape of curved concave box in which hollow pieces 9a of comparatively large size are placed in parallel to the direction of the width of 9 and longitudinal tensile wires 9d acting as pressure resisting members are placed between each hollow piece, and a flexible metal sheet 9c is adhered to and along the inside periphery of above box shaped rubber plate 9. By this structure, when the temperature at the light collecting portion rises, the hollow piece 9a expands, but the expansion in radial direction is restricted by the tensile wires 9d as pressure resisting members, and so, the hollow piece 9a tends to expand in lateral direction. So, due to the fixation at two extremities, the thermo-deforming plate bends and deforms as a whole as shown in the embodiment.

Moreover, as shown in FIG. 6 and FIG. 7, the thermo-deforming plate can be a circumferentially connected hollow body 10 comprising continued engagement formed by inner tubular members 10a closed in each one side and outer tubular members 10b enclosing and engaging with above members 10a where the upper surface of the hollow body 10 is to form the inside curved surface and the lower surface has protrusions 10c and all the hollow portions contain a kind of liquid which evaporates following the temperature rise and liquefies following the temperature drop. The connected hollow body 10 may be engaged and connected as shown in FIG. 7, and may constitute the thermo-deforming plate having many bumps formed by protrusions 10c in its lower side and having a flexible metallic sheet 11 adhered on its top side as shown in FIG. 6. In this case, due to the temperature rise of the connected body 10 at the light collecting portion and to the following evaporation of part of the liquid contained therein, the protrusions 10c to be easily deformed are expanded to the outward direction of enlarging and the upper surface of the connected body 10 tends to shrink. As a result, due to the fixation at two extremities not shown in the figure, the upper surface of the connected body becomes the lowest portion of curved concave at the said portion and the connected body bends curved as a whole. When the light collected there gradually displaces, the temperature of the portion falls gradually with the re-liquefaction of the liquid therein and the protrusion returns to the original situation by gradual dissipation of its expansion. In the above example, the thermo-deforming plate, bending and deforming more rapidly by means of the light collection, can make the apparatus pursue the sun more precisely. Moreover, as another example of variation of the connected body, it is possible to give the configuration of its lower surface as shown in FIG. 8.

Further, the form of the convex lens has no limitation. A convex form opposite to the form of the thermo-deforming plate as shown in FIG. 9 is more effective for the light collection.

Moreover, one can freely select the material and the configuration of the follower rod and the rolling piece, and the structure to forcibly press down them down.

Also the kind of the light collector and the means of fixing it to the rotary shaft can be chosen without any limitation.

In the structure of this invention, the light collector inclines caused by the swivelling motion of the follower rod which constantly displaces the rolling piece to the lowest portion of curved concave of the thermo-deforming plate, and so the apparatus is very effective thanks to its low equipment cost without need of driving system such as an electric motor and to its easy maintenance.

What is claimed is:

1. Apparatus for pursuing the sun to secure a constant sunlight energy source, comprising:
    a rotary shaft equipped with a sunlight receiver;
    a thermo-deforming plate secured at its two extremities which deforms to force an area in proximity to a light collecting portion of said plate with a raised temperature to provide a lowest portion of a curved concave;
    a convex lens placed over said thermo-deforming plate; and
    a follower rod equipped with a rolling piece in its lower end pivotally connected to said rotary shaft in a manner to be able to swivel said shaft in an axial direction of the rotary shaft; and
    wherein said thermo-deforming plate in curved concave form is disposed underneath and transverse to the rotary shaft and the rolling piece of said follower rod is placed on said thermo-deforming plate in a manner so that the follower rod is forcibly pressed down to place the rolling piece constantly against the curved concave of the thermo-deforming plate formed by thermal deformation.

2. The apparatus of claim 1, wherein said thermo-deforming plate comprises:

a rubber plate preformed into a curved concave box in which independent hollow pieces are placed in parallel in a direction of width of said rubber plate; pressure-resisting members are placed between each hollow piece; and a flexible metal sheet is adhered to and along an inside periphery of said rubber plate.

3. The apparatus of claim 1 wherein said thermo-deforming plate is formed into a hollow space with many bumps along its lower periphery, wherein the hollow space is partitioned relative to said bumps and contains a liquid which evaporates following a temperature rise and liquefies following a temperature drop inside of each partitioned hollow.

4. The apparatus of claim 1, wherein said thermo-deforming plate is in approximately semi-circular form having an approximate geometrical axis along an axis of the rotary shaft.

5. The apparatus of claim 1, wherein the follower rod is forcibly pressed down by means of a spring.

* * * * *